(12) United States Patent
Marshall

(10) Patent No.: US 7,318,564 B1
(45) Date of Patent: *Jan. 15, 2008

(54) POWER LINE SENTRY CHARGING

(75) Inventor: Patrick T. Marshall, Tipp City, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 147 days.

This patent is subject to a terminal disclaimer.

(21) Appl. No.: 11/169,260

(22) Filed: Jun. 24, 2005

Related U.S. Application Data

(60) Provisional application No. 60/617,798, filed on Oct. 4, 2004.

(51) Int. Cl.
*B64D 41/00* (2006.01)
*B64D 45/00* (2006.01)
*B64C 25/68* (2006.01)
*B64F 1/02* (2006.01)
*B60L 9/00* (2006.01)

(52) U.S. Cl. ................ 244/58; 244/100 R; 244/110 R; 244/110 G; 244/117 R; 244/1 R; 244/190; 244/12.3; 191/10

(58) Field of Classification Search .... 244/53 R–53 B, 244/110 C, 110 E, 110 F, 110 G, 1 R, 100 R, 244/110 R; 191/10; 320/108, 109
See application file for complete search history.

(56) References Cited

U.S. PATENT DOCUMENTS

| | | | |
|---|---|---|---|
| 2,146,555 A | | 2/1939 | Arey |
| 3,197,702 A | | 7/1965 | Schweitzer, Jr. |
| 3,705,387 A | * | 12/1972 | Stern et al. .................. 446/460 |
| 4,036,147 A | * | 7/1977 | Westling ..................... 104/23.1 |
| 4,384,289 A | | 5/1983 | Stillwell et al. |
| 4,421,301 A | * | 12/1983 | Chapman .............. 254/134.3 R |
| 4,531,714 A | * | 7/1985 | Bahr ..................... 254/134.3 R |
| 4,625,172 A | | 11/1986 | Yamamura et al. |

(Continued)

FOREIGN PATENT DOCUMENTS

EP 479181 A2 * 4/1992

OTHER PUBLICATIONS

R. Hundley et al., "Future Technology-Driven Revolutions in Military Operations", 1994, RAND Corporation, Document No. DB-110-ARPA.

(Continued)

*Primary Examiner*—Teri Pham Luu
*Assistant Examiner*—Joshua Michener
(74) *Attorney, Agent, or Firm*—AFMCLO/JAZ; Gerald B. Hollins

(57) ABSTRACT

A surveillance aircraft recharging system based on energy collection by magnetic induction from the current flowing in a randomly selected alternating current transmission line conductor. The charging energy originates in the magnetic field surrounding the current carrying conductor and is obtained by way of a laminated magnetic circuit surrounding the current carrying conductor and disposable in both an open and transmission line receiving state and a closed and energy collecting state upon command. Latching of the magnetic structure into a condition providing physical suspension stability for the host aircraft as well as an efficient magnetic circuit are provided. Latching of the magnetic structure includes a docking aircraft kinetic energy storage sequence assisting in aircraft deceleration and also providing saved energy useful during an undocking sequence.

11 Claims, 8 Drawing Sheets

U.S. PATENT DOCUMENTS

| | | |
|---|---|---|
| 4,728,887 A | 3/1988 | Davis |
| 4,818,990 A | 4/1989 | Fernandes |
| 4,886,980 A | 12/1989 | Fernandes et al. |
| 4,891,576 A | 1/1990 | Jacobs et al. |
| 4,904,996 A * | 2/1990 | Fernandes ............ 340/870.07 |
| 4,907,764 A | 3/1990 | Long |
| 4,955,560 A | 9/1990 | Nishina et al. |
| 5,157,319 A | 10/1992 | Klontz et al. |
| 5,301,096 A | 4/1994 | Klontz et al. |
| 5,351,032 A * | 9/1994 | Latorre et al. ............. 340/983 |
| 5,653,174 A * | 8/1997 | Halus ........................ 104/124 |
| 6,057,668 A | 5/2000 | Chao |
| 6,100,663 A | 8/2000 | Boys et al. |
| 6,184,651 B1 | 2/2001 | Fernandez et al. |
| 6,270,038 B1 | 8/2001 | Cycon et al. |
| 6,658,124 B1 | 12/2003 | Meadows |
| 6,677,726 B2 | 1/2004 | Hensel |
| 6,729,021 B2 | 5/2004 | Panico et al. |
| 6,742,741 B1 | 6/2004 | Rivoli |
| 6,766,226 B2 | 7/2004 | Andersen |
| 6,868,314 B1 | 3/2005 | Frink |
| 7,152,828 B1 * | 12/2006 | Garcia et al. ............ 244/135 A |
| 2005/0017751 A1 | 1/2005 | Gunn et al. |
| 2005/0022590 A1 * | 2/2005 | Huynh .................... 73/170.02 |

OTHER PUBLICATIONS

J. Grasmeyer et al., "Development of the Black Widow Micro Air Vehicle", American Institute of Aeronautics and Astronautics, 2001, AIAA-2001-0127.

* cited by examiner

POWER LINE SENTRY CHARGING

CLAIM OF PRIORITY

This application claims the benefit of U.S. Provisional Patent Application No. 60/617,798, filed Oct. 4, 2004. The contents of this provisional application are hereby incorporated by reference herein.

CROSS REFERENCE TO RELATED PATENT DOCUMENT

The present document is somewhat related to the copending and commonly assigned patent document "POWER LINE SENTRY", Ser. No. 11/169,259. The contents of this somewhat related application are hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Most modern-day wars are fought in urban environments. Large cities and small towns are the battlegrounds of choice by many present-day enemies. Unfortunately, this environment allows opponents to hide in numerous structures and amongst non-combatant civilians. These environments also provide a much harder and more complicated war to fight than existed in many previous conflicts. In simple terms, one reason for this is that walls tend to get in the way of today's battlefield communications and sensor technologies. One solution to this major new U.S. military problem lies in the time-honored profession of human reconnaissance and surveillance, especially with respect to enemy encounters that involve battles in urban neighborhoods. Unfortunately, it may take years before the United States can develop a capability to successfully gain information regarding this new type of enemy.

Consequently, there is little alternative except to approach a complicated problem with the use of high-technology systems, systems such as satellites and unmanned aerial vehicles, UAV's, used for surveillance purposes. Such systems may include silent, battery-powered, mini and micro-UAVs, i.e., silent unmanned aerial vehicles. Limited battery energy is however currently a major technological hurdle for all-electric silent unmanned aerial vehicles making them unsuitable for most urban battlefield environments. Using today's "off-the-shelf" secondary battery technology, a silent unmanned aerial vehicle (depending on aerodynamic capability and DC motor size) can perform for at most, 60 minutes out in an urban environment. This capability is of course partly consumed by the time it takes for the silent unmanned aerial vehicle to make a round trip away from and back to a base i.e., half, more or less of the silent unmanned aerial vehicle's energy can be lost on the round trip to and from a base. From a differing perspective, this limited capability additionally means a silent unmanned aerial vehicle dependent military unit must be located sufficiently close to an urban area to make the unmanned aerial vehicle effective as a surveillance tool. These considerations presently make current silent unmanned aerial vehicle technologies quite limited for real-time urban military operations.

At first blush one might be tempted to make a silent unmanned aerial vehicle smaller and lighter and thus decrease the level of the required propulsion energy. Unfortunately, however there are very severe physics limitations to the methodology of shrinking an unmanned aerial vehicle both in size and weight. Doing so creates a much more serious mission-capability dilemma in that as the size and weight of the unmanned aerial vehicle decreases, its payload capacity decreases not linearly, but exponentially[i]! (Numbers of this type refer to the list of publications at the end of this specification.) Also, the aeronautical equations dependent on a "Reynolds" number are not usable for small air vehicles of, for example, less than 18 inches in size. Thus use of current-off-the-shelf (COTS) aeronautical CAD software to help design silent unmanned aerial vehicles of these sizes is not possible and one has no recourse but to "guess" a solution and hope it flies. This situation is worsened more by the fact that various aerodynamic instabilities are magnified as the vehicle size decreases[ii]. This particular problem can be seen in nature while small birds are landing or fighting-off gusts of wind. These birds have to flex and twist their wings and tails to compensate for instantaneous instabilities. Thus it may be appreciated that making electric UAVs smaller presents several technological obstacles.

As a result of these difficulties, existing and pending electric silent unmanned aerial vehicles are useful for only very limited DoD missions. Moreover the personnel that operate and maintain these vehicles must resign themselves to the fact that the battery-power problem is an existing limitation that unfortunately must be factored into the performed mission. Although a new battery technology offering significantly improved energy storage density may ultimately change this picture, it appears likely that this will not occur soon. If laptop computers are used for comparison, in view of their use of similar rechargeable batteries, it may be observed that over the last decade, battery technologies have barely progressed, progressed not nearly as rapidly as other computer related devices such as CPU speed and RAM capacity. In a similar vein of thought the electrically driven automobile is now being approached with use of hybrid electrical motor and fuel driven engine arrangements and with fuel cells but in a large part awaits the availability of rechargeable batteries of suitable energy storage density before becoming widely used.

The present invention is believed to offer at least a partial solution to these difficulties and to make the silent unmanned aerial vehicle a bit closer to being of practical value especially in a military environment. Theoretically silent unmanned aerial vehicle units made with use of the present invention arrangement for acquiring energy can operate in an urban field for an indefinite time interval (i.e., 24/7/365 capability) with infrequent "return-to-base" cycles being required. Most importantly this long term performance is available with use of presently available technology including present day secondary batteries.

The prior art shows numerous uses of inductively coupled electrical energy, energy coupled by way of a magnetic field rather than by electrical circuit continuity. These uses include for example the electric toothbrush, electrical measuring instruments and cellular telephones in the small energy quantity range and extend to submersible vehicles and other propulsion and underwater applications in the larger energy quantity range. These uses and others are included in the several prior art patents identified in the disclosure statement filed with the application of the present patent documents the contents of these issued patents is hereby incorporated by reference herein. None of these energy transmission inventions appear however to have involved an airborne surveillance vehicle or the possibly surreptitious or clandestine acquisition of inductively coupled electrical energy found in the present invention.

SUMMARY OF THE INVENTION

The present invention provides a random transmission line electrical current flow based charging for a battery used in a sub human sized surveillance aircraft.

It is therefore an object of the present invention to provide electrically energized silent unmanned aerial vehicle propulsion achievable with present day battery technology and other current technology.

It is another object of the invention to provide unmanned aerial vehicle recharging that is responsive to electrical current flow rather than operating voltage in a transmission line conductor.

It is another object of the invention to provide an aerial vehicle recharging energy source usage that also acts as a physical suspension element for an aircraft vehicle.

It is another object of the invention to provide a battery recharging energy source inclusive of "borrowing" electrical energy from a random convenient transmission line conductor that may be owned by a hostile entity.

It is another object of the invention to provide a battery recharging energy source that includes a physical latch for rigorous and resilient temporary engagement with a transmission line conductor.

It is another object of the invention to provide a clamp-on energy collector usable with a transmission line conductor.

It is another object of the invention to provide an aircraft mountable transmission line energy collector.

It is another object of the invention to provide a laminated alternating current transmission line energy collector that may be operated over a wide range of input current level.

These and other objects of the invention will become apparent as the description of the representative embodiments proceeds.

These and other objects of the invention are achieved by the method of recharging a propulsion battery in a sub human sized aircraft comprising the steps of:

locating a convenient alternating current electrical energy transmission line conductor in a geographic region occupied by said aircraft, said locating step including one of transmission line conductor magnetic field sensing and transmission line conductor visual sighting;

flying said aircraft into a position of physical engagement with said transmission line conductor, said physical engagement including an enclosing of said conductor within an incomplete magnetic circuit carried by said aircraft;

completing said magnetic circuit around said transmission line conductor in response to a command to physically move a magnetic circuit element portion thereof, said completing step including engagement of a controlling magnetic circuit latching mechanism;

collecting battery charging electrical energy from said completed magnetic circuit;

disengaging said magnetic circuit element and said latching mechanism and returning said aircraft to powered flight upon command;

repeating said locating through disengaging sequence of steps with one of said transmission line conductor and a new transmission line conductor upon command and as needed by said battery and said aircraft.

BRIEF DESCRIPTION OF THE DRAWINGS

The accompanying drawings incorporated in and forming a part of the specification, illustrate several aspects of the present invention and together with the description serve to explain the principles of the invention. In the drawings.

DETAILED DESCRIPTION

A key concept to the present invention is that "Numerous overhead power transmission lines that frequent most urban areas may be utilized by silent unmanned aerial vehicles to inductively recharge themselves while perched". Theoretically these "power line-rechargeable" silent unmanned aerial vehicle units should be able to operate out in the urban field for an indefinite amount of time (i.e., 24/7/365 capability) with very infrequent "return-to-base" cycles being required. A typical urban military operation may for example involve launching swarms of present invention silent unmanned aerial vehicles weeks or even months before troops arrive to seek-out and terminate various combatants. For example, Special Operations troops may preprogram these vehicles to fly to local power lines near the urban areas of interest. If the duration of flight exhausts the battery power, then the silent unmanned aerial vehicles may simply locate the nearest power line for a temporary recharging. Once recharged, the silent unmanned aerial vehicles can continue their flight towards the urban theater destination. Upon reaching the theater, the silent unmanned aerial vehicles may then fly high above the area to visually, infrared, radar and possibly audibly locate particular targets of interest. Such silent unmanned aerial vehicles can then transmit intelligence-related information, from a comfortable distance, back to a command center. Chemical and biological sensors may also be mounted onboard the aircraft to warn of impending threats.

Figure 1A:
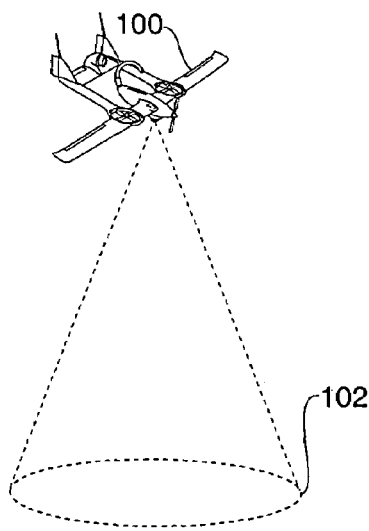
FIG. 1 includes the views of FIG. 1a, FIG. 1b and FIG. 1c and shows a silent unmanned aerial vehicle according to the present invention in three different operating modes.
Figure 1B:
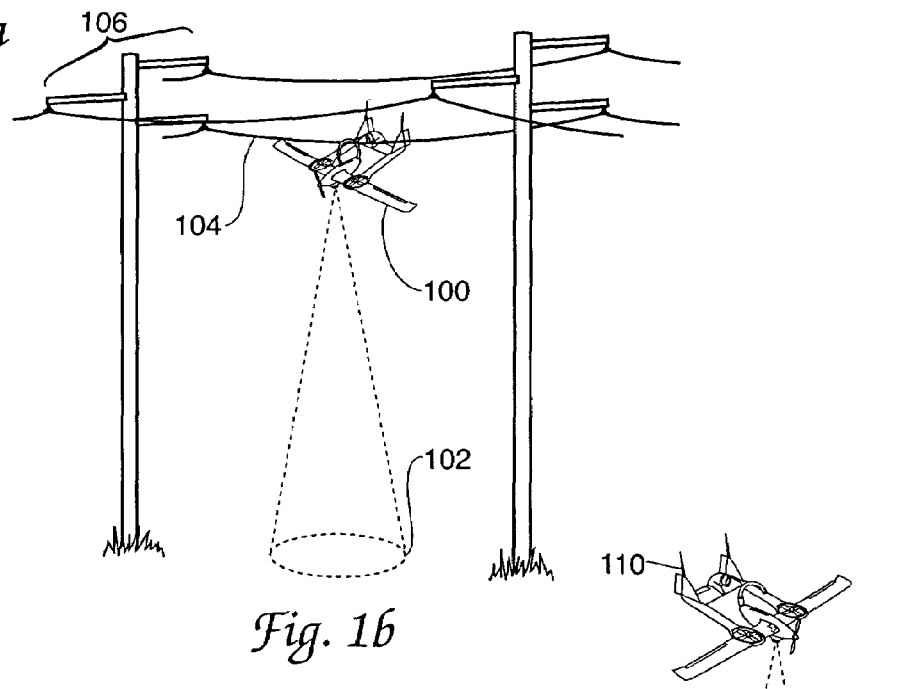
Figure 1C:
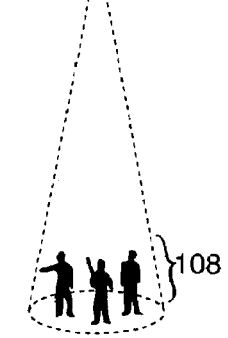

FIG. 1 in the drawings shows three events in the operating sequence of an electrical silent unmanned aerial vehicle according to the present invention, these events appear in the FIG. 1a, FIG. 1b and FIG. 1c drawing views. In the FIG. 1a view a battery operated multiple propeller driven silent unmanned aerial vehicle 100 has been launched and is conducting an optical surveillance operation over an open terrain area 102. The silent unmanned aerial vehicle 100 may be in real-time or store and dump communication with a command center or other user. In the FIG. 1b drawing the silent unmanned aerial vehicle 100 continues to examine a surveillance area 102 but has now attached itself to one conductor 104 of a convenient electrical energy transmission line 106 where recharging of its electrical battery ensues and the surveillance activity is focused on a selected area 102 adjacent to the transmission line 106. The silent unmanned aerial vehicle attachment represented in FIG. 1*b* may result from a flight path that is either generally perpendicular to or tangent to the transmission line conductor 104 as is discussed in detail below. In the FIG. 1*c* drawing the silent unmanned aerial vehicle 100 has located persons 108 of interest in a particular mission and is maintaining these persons under continuous close surveillance while circling in a suitable flight path and also while communicating the collected video data back to a command center as is implied by the antenna at 110.

Events shown in the FIG. 1*b* drawing suggest a particular focus of the present invention. In this drawing the silent unmanned aerial vehicle 100 has attached itself to one phase conductor 104 of a high-voltage electrical energy transmission line 106 previously located by the silent unmanned aerial vehicle or known to exist from prior knowledge of the area under surveillance. The phase conductor 104 may be operating at any of the voltages used for electrical energy distribution or transmission, any voltage between 100 volts and 1,000,000 volts for example. Preferably however the electrical current flowing in the conductor 104 is in the several tens of amperes to hundreds of amperes range. The operating frequency of the transmission line 106 is assumed to be of the 50 Hertz or 60 Hertz frequency used in essentially all of the world. Higher frequency transmission lines if they happen to be found by the silent unmanned aerial vehicle are even more advantageous for present energy collection purposes.

Figure 2A:
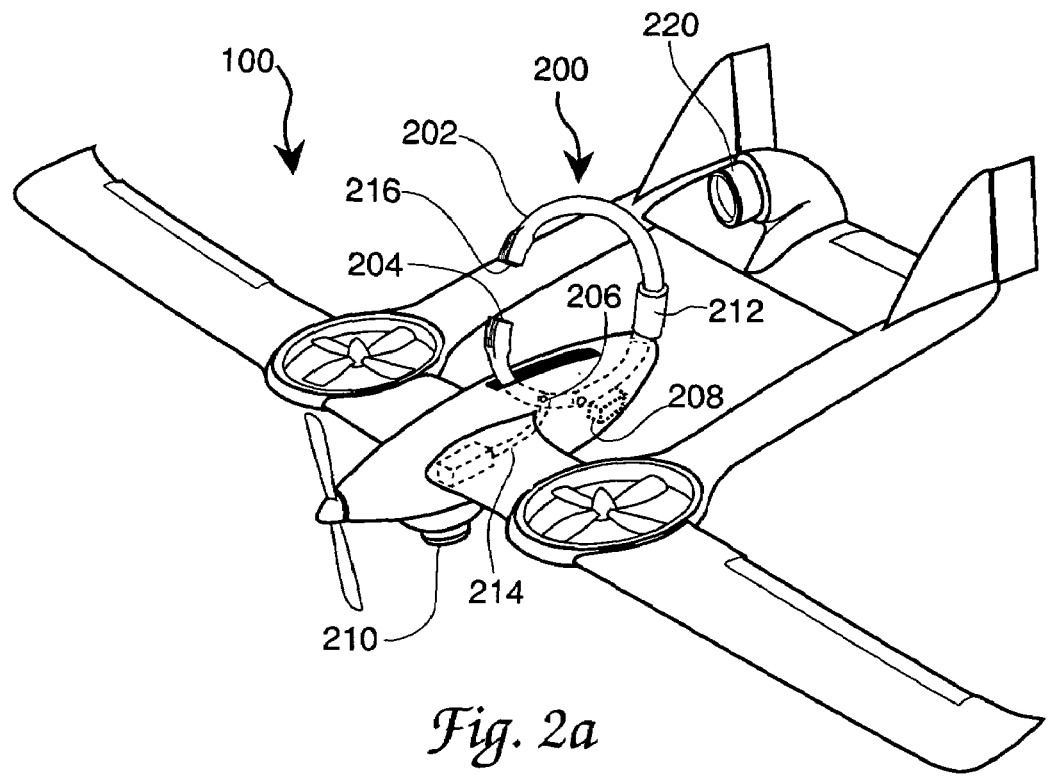
FIG. 2 includes the views of FIG. 2A and FIG. 2B and shows a silent unmanned aerial vehicle of the present invention type in greater detail.
Figure 2B:
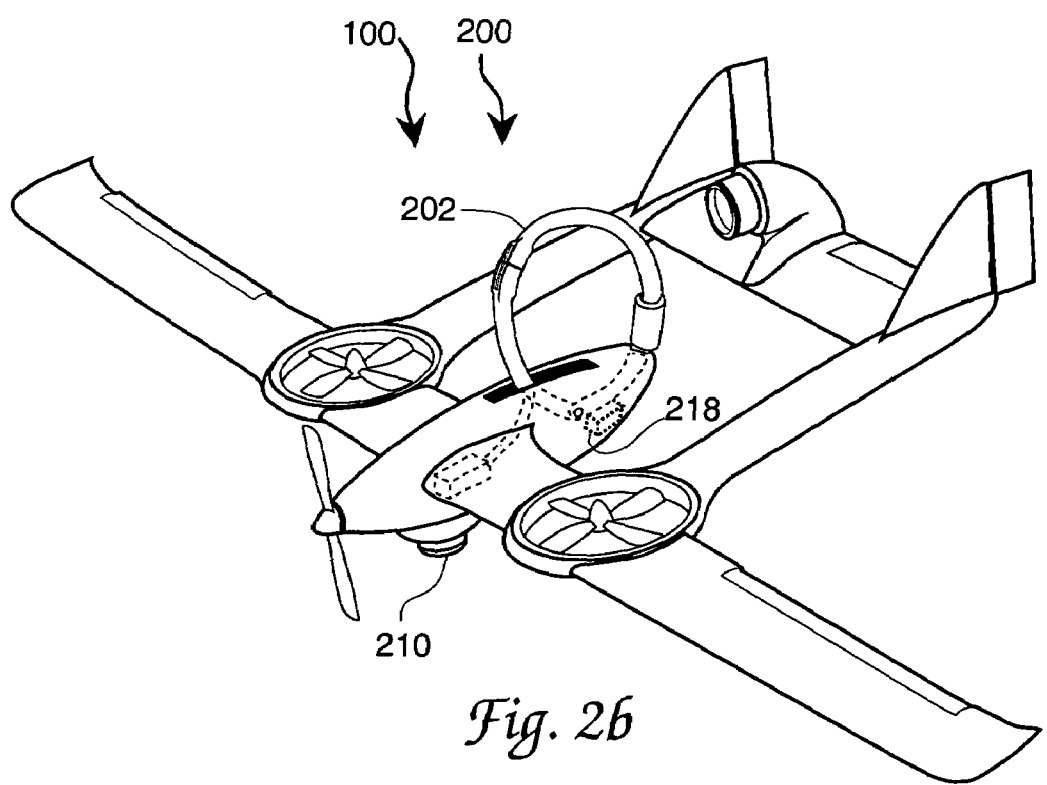
Figure 4:
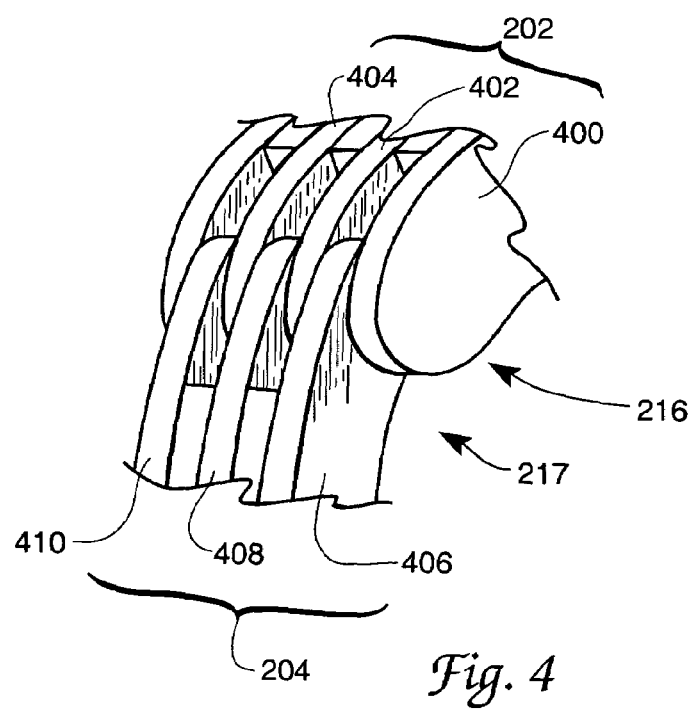
FIG. 4 shows details of one arrangement for the magnetic core 202 and the movable jaw portion 204.

FIG. 2 in the drawings includes the views of FIG. 2*a* and FIG. 2*b* and shows the silent unmanned aerial vehicle 100 itself and the energy collection apparatus 200 for the silent unmanned aerial vehicle in greater detail. In the FIG. 2*a* drawing the silent unmanned aerial vehicle appears in an oblique view wherein a lens array for the video camera included in the airframe appears at 210 in a lower part of the vehicle or aircraft and the energy collection apparatus 200 is shown to be attached to an upper part of the vehicle by way of a mounting bracket appearing at 208. The FIG. 2*a* energy collecting apparatus 200 is represented as an open jawed magnetic core 202 having a movable jaw portion 204 closable onto a mating face 216 or on to a magnetic coupler of the core 202 by an actuating rod 214 following engagement with the energy supplying transmission line conductor 104. Engagement of the face 216 with a mating or interleaved face 217 of the movable jaw portion 204 as shown in FIG. 4 or in some other manner is achieved.

A motor or solenoid mechanism within the airframe of the FIG. 2 aircraft may be used to move the actuating rod 214 into a closed position upon receipt of a latching command from a ground controller or an internal computer. In the closed jaw condition the silent unmanned aerial vehicle is both securely attached to the transmission line conductor 104 and thus precluded from disengagement at the hand of wind bursts or other phenomenon and is also providing of an energy collecting closed magnetic circuit around the transmission line conductor 104. Significantly, in the absence of another conductor completing an electrical circuit from the transmission line conductor 104 or from the silent unmanned aerial vehicle 100 to earth etc., there is no transmission line voltage-dependent current flow to cause arcing damage to the silent unmanned aerial vehicle 100 in the FIG. 1 and FIG. 2 suspended condition. This desirable isolation prevails regardless of the 69 kilovolt or other operating potential of the transmission line conductor 104.

Magnetic circuits having physically open and closed operating positions as shown in FIG. 2*a* are known in the art and are to be found for example in the "Tong Test" and "Amprobe" portable current measuring instrument field where such a two position magnetic circuit enables current magnitude measurement to be accomplished without interruption of current flow in the measured circuit. The names "Tong Test" and "Amprobe" are believed to be trademarks of The General Electric Company and the Florida-based Advanced Test Products Company. One arrangement of the movable yet magnetically integral joints in such a magnetic circuit is shown in greater detail in the FIG. 4 drawing herein, another appears at 800 in the FIG. 8 drawing. Magnetic circuits of greater ferrous cross sectional area than those used in measuring instruments are of course possible and are preferable in response to the greater energy needs of the present invention. A movable magnetic circuit measurement instrument inclusive of a magnetic coupling is shown in the U.S. Pat. No. 2,146,555 identified herewith.

In the FIG. 2*b* drawing the silent unmanned aerial vehicle also appears in an oblique view wherein a lens array for the video camera included in the airframe appears at 210 in a lower part of the aircraft and the energy collection apparatus 200 is shown to be attached to an upper part of the vehicle by way of an upper wing received bracket appearing at 218. Notably in the FIG. 2*b* drawing the bracket 218 and the energy collection apparatus itself are rotated by ninety degrees from that shown in the FIG. 2*a* drawing. This rotation enables the FIG. 2*b* silent unmanned aerial vehicle to engage a transmission line phase conductor 104 during a lengthwise or axial tangency approach to the conductor rather than from the substantially orthogonal approach contemplated for the FIG. 2*a* silent unmanned aerial vehicle. As the combination of the FIG. 2*a* and FIG. 2*b* drawings may suggest the collection apparatus 200 may be mounted in any rotational position with respect to the airframe 210 or also may disposed in a movable and operator controllable arrangement enabling any angled approach of silent unmanned aerial vehicle to a transmission line conductor. The non orthogonal of these possible approaches are of course useful in permitting a more gradual deceleration or acceleration of the silent unmanned aerial vehicle in the transition from flying to parked or docked status and vise versa.

As is represented at 220 in the FIG. 2*a* and FIG. 2*b* drawings an additional video camera or a time shared camera input port associated with the camera assembly at 210 may be disposed in the tail or other convenient location of the silent unmanned aerial vehicle in order to provide a remote operator with a view of the engaging and disengaging of the silent unmanned aerial vehicle with respect to a transmission line conductor. Use of a second camera or coupling between camera locations 210 and 220 using for example fiber optic paths within the silent unmanned aerial vehicle are preferable arrangements for this engaging and disengaging or docking and undocking view from the silent unmanned aerial vehicle. The sensing of magnetic field strength surrounding a transmission line conductor, as is described in the identified U.S. Pat. Nos. 3,197,702 and 4,818,990 may be used as an additional aid in the performance of such a docking maneuver. Closure of the movable jaw member 204 onto a mating face 216 or a magnetic coupling portion of the core 202 by actuating rod 214 may also be viewed critically from a camera location such as that shown at 220.

Figure 3:
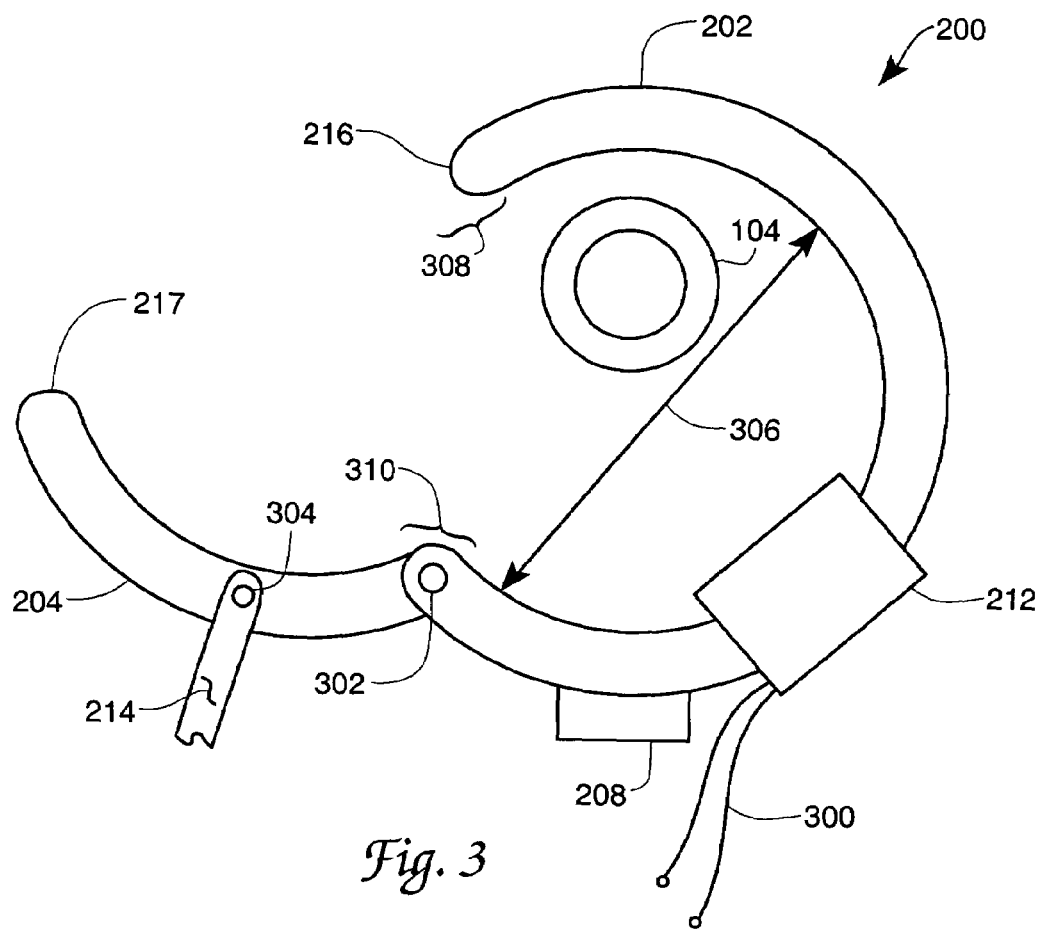
FIG. 3 shows a part of the FIG. 1 and FIG. 2 silent unmanned aerial vehicle in yet greater detail.

In FIG. 3 there is shown the pin 302 by which the movable jaw member 204 is made to be closable onto a mating face 216 of the core 202 by the actuating rod 214. A second rotatable pin member 304 provides for similar rotation between the movable jaw 204 and the partially shown actuating rod 214. The FIG. 3 drawing also shows the winding bundle 212 and leads 300 by which the magnetic flux from the transmission line conductor 104 is enabled to generate electrical energy for use in battery charging and other purposes in the silent unmanned aerial vehicle. As indicated in the FIG. 3 drawing the transmission line conductor 104 is often of the hollow or annular shape found desirable in present day long distance high-voltage transmission lines or alternately may be of the stranded or solid conductor variety. Often such conductors are fabricated to have a circular tongue and groove configuration as is suggested in the FIG. 6 drawing. The construction of conductor 104 and the relative size of conductor 104 with respect to the diameter 306 of the core 202 are of little if any importance in determining characteristics of the inductive energy collection arrangement of the invention. Visualization of a drawing similar to FIG. 3 for the rotated or rotatable energy collection arrangements discussed in connection with FIG. 2b is believed to be within the skill of persons familiar with this art.

Once conductor 104 becomes enclosed by the core 202 and the closed movable jaw 204 this entire configuration becomes an electromagnet as long as there is current flowing in the transmission line conductor 104. The problem here is that the two parts of the core 202 now "attract" each other. This is a significant consideration during the delatching process. We find a simple solution to this consideration exists in the form of shorting the two wires 300 together; this stops the attracting fields and allows disengagement. A simple relay or MOSFET can be used to achieve this function in a practical embodiment of the invention. A resistor in series may help dissipate the heat generated. FIG. 4 in the drawings shows one arrangement for the core 202 and the movable jaw 204 that may be used in the regions 308 and 310, the regions of core and movable jaw intersection within the magnetic circuit of the FIG. 3 drawing. As indicated in the FIG. 4 drawing it is preferable that the core 202 and the movable jaw each be of the laminated nature frequently used in alternating current machinery flux paths in order to limit the energy loss effects of eddy currents induced in these components. Lamination thickness used in these components is somewhat of a tradeoff between the low losses achieved with thin laminations and the physical rigidity, convenience and maintained joint alignment at 308 for example provided by thicker laminations. Thicker laminations representing the core 202 are shown at 400, 402 and 404 in the FIG. 4 drawing where they are interleaved with the also thick laminations 406, 408, and 410 that are part of the movable arm 204 in the jaw closed or integral core condition.

As implied by the illustrated curvature of the laminations shown in FIG. 4, the FIG. 4 drawing represents the intersection of core and movable arm occurring at 308 in FIG. 3. A larger number of laminations than are represented in FIG. 4 and other drawings herein may be desirable for use in the invention in order to generate a greater extraction of energy from the transmission line 104 for present invention usage. Other arrangements of the lamination intersections at 308 and 310 are of course feasible and are perhaps more practical than that shown in FIG. 3 and FIG. 4 in some instances. The use of machined surfaces on the core 202, in the facial area 216, and the use of similar and complementing machined surfaces on the movable member 204 together with a sliding motion engagement of machined surfaces by the movable arm 214 are particularly attractive alternatives to the FIG. 4 arrangement of these components.

The core 202 and winding bundle 212 are of course in the nature of a current transformer device as is often used in the electrical measuring art for determining the magnitude of transmission line and other alternating currents. Such current transformers are available from numerous sources in the electrical art; including for example Ohio Semitronics, Inc. of Hilliard, Ohio and CR Magnetics, Inc. of St. Louis, Mo. The latter manufacturer offers a line of "Split-Core" current transformers identified as the type CR 3110 that are of interest in view of their jointed magnetic circuit and other details appearing relevant to the needs of the present invention. These CR Magnetics transformers if not per se usable in the present setting provide a closely related standard item starting point from which an optimum apparatus for use at 200 in the present invention may be achieved.

Figure 5:
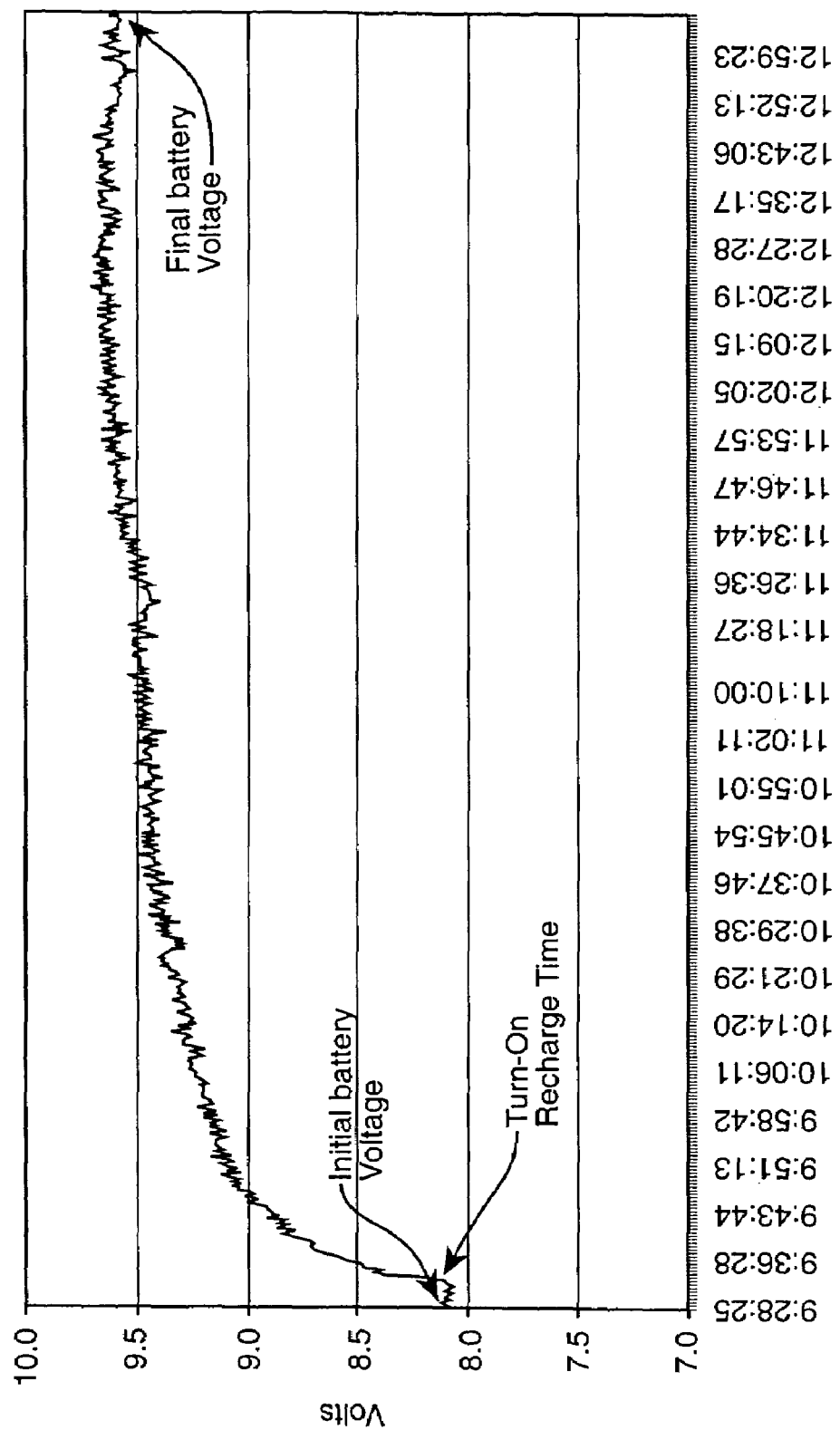
FIG. 5 shows an achieved battery charging history.

FIG. 5 in the drawings shows the results of an experiment in which an 8.4-volt Nickel Metal Hydride battery has been charged by inductive coupling with an average 54-ampere current flowing in a 7.15 kilovolt residential power distribution transmission line, i.e., charged in the manner of the present invention. In the FIG. 5 drawing an inductively generated current flow of about 150 milliamperes is used to trickle-charge i.e., is applied to a Nickel Metal Hydride battery of some 900 milliampere-hours electrical capacity and maintained for three and one-half hours in order to increase the battery terminal voltage from an initial largely-discharged value of about 8.1 volts to a final value of about 9.6 volts. A simple trickle-charging circuitry, which is suitable for most NiCad and NiMH battery chemistries, can be utilized to generate the data in FIG. 5, such a circuit is for example shown in the FIG. 9 drawing herein. Assuming such a trickle-charging sequence is achieved, the power line basically can supply a sufficient amount of energy over a period of time for any UAV configuration regardless of the size of the battery. The amount of energy being transferred is dependent on the amount of current flowing in the transmission line conductor. Assuming the current in the transmission line is held constant, the amount of time required to recharge the battery is proportional to its energy capacity in milliamperes-hours. The larger the milliampere-hour capacity, the longer the UAV may sit and recharge.

A more advance version of the invention can entail replacing the trickle-charging circuit with a fast-charger as recharging circuit. Chips such as the Maxim MAX1772 multichemistry battery charger can be utilized in this case to recharge, for example, lithium batteries which require a more sophisticated charging scheme than a trickle-charger. The FIG. 5 graph is viewed as a confirmation of the overall principle of battery charging by way of inductive coupling from a current-conveying transmission line conductor rather than being an illustration of a fully developed embodiment of the invention. This is true especially since battery voltages of greater magnitude than 9.0 are viewed as being most practical for silent unmanned aerial vehicle propulsion over militarily realistic distances. Time for charging is of course the hidden variable in the charging of the present invention; even though the amounts of energy represented in FIG. 5 are relatively small, even these amounts of energy become significant for present usage when the charging event is extended over a sufficient charging time interval.

Figure 6:
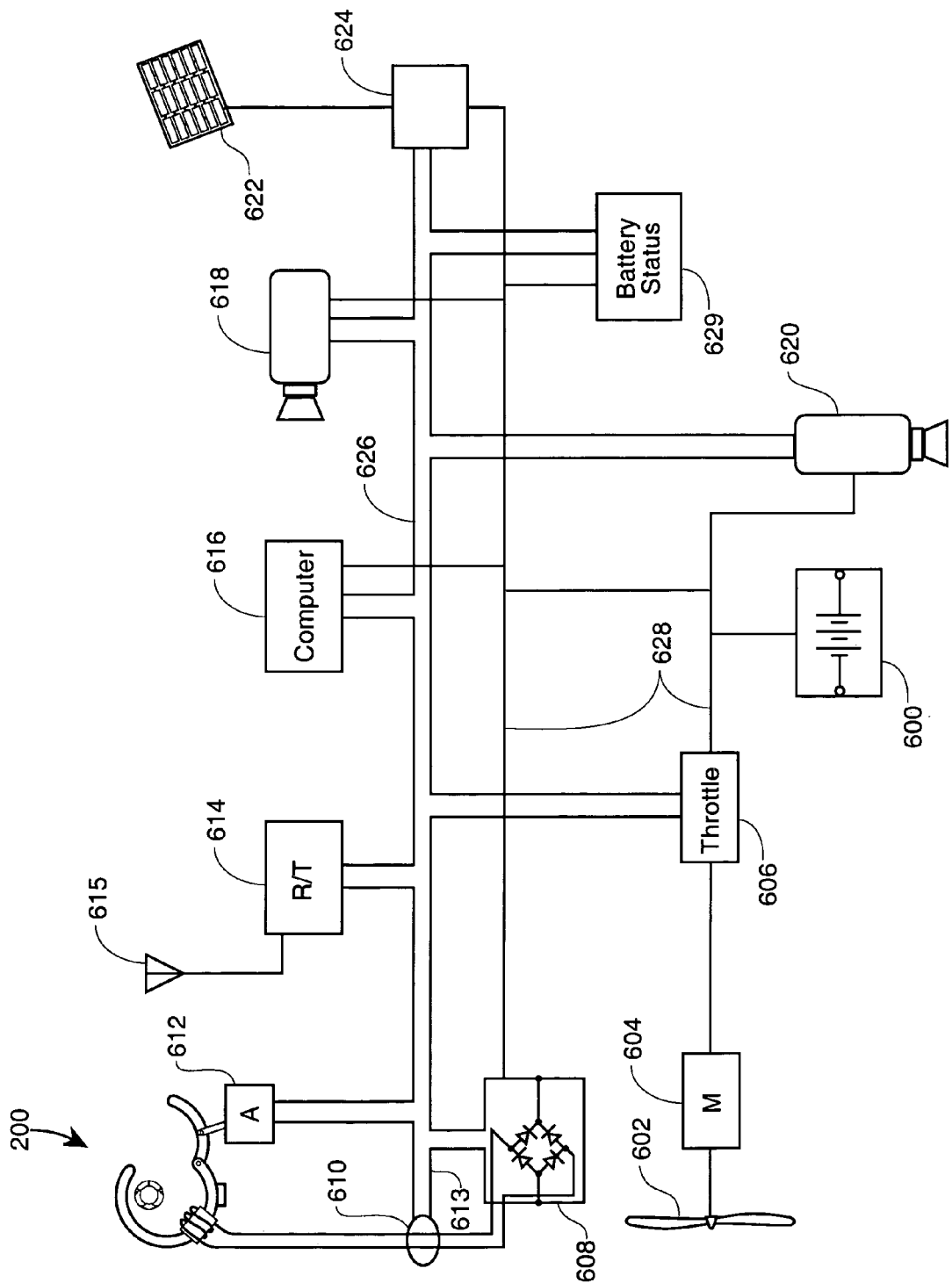
FIG. 6 shows a block diagram of elements within a surveillance aircraft such as the aircraft 100.

FIG. 6 in the drawings shows a coarse general block diagram of electrical components to be included in the silent unmanned aerial vehicle of the present invention; a brief description of components in this diagram not already discussed at length follows. The rechargeable battery used to energize the propulsion, control and mission related components of a present invention silent unmanned aerial vehicle appears at 600 in FIG. 6. This battery is provided with recharging energy by the induction pickup assembly 200 in FIG. 5 and this energy is supplemented by a solar cell array 622 operated by the solar cell controller 624. Energy flow between these recharging sources and the battery 600 and each of the loads shown in FIG. 6 is accomplished by a power bus 628. Functional control over each of these load/sources is achieved by computer 616 and a computer operated bidirectional communication bus 626. The charged/discharged condition of battery 600 is for example sensed by the status circuitry indicated at 629 and communicated to the operator of the vehicle by way of the bus 626 and computer 616 and the radio frequency circuits at 614. This status is of course important in determining need for a parking and recharging time interval and precluding loss of a totally discharged silent unmanned aerial vehicle. Real time sensing of battery charging activity is accomplished by way of the bus 626 and a sensing apparatus 610; this precludes attempts to recharge from a transmission line conductor already disabled by military action for example or indicates the need to locate a more active transmission line conductor carrying a greater current.

On and Off control of the silent unmanned aerial vehicle driving motor 604 as well as speed control of this motor is determined by the computer 616 and the bus 626 by way of an electronic throttle package 606. Low loss switching circuitry in lieu of analog circuits are preferred for use in the electronic throttle package 606; this circuitry may also include reverse energy flow provisions in order to take advantage of propeller windmill-generated energy occurring during silent unmanned aerial vehicle diving or landing events. Command signals and surveillance data signals are communicated between the silent unmanned aerial vehicle computer 616 and a ground based station by way of the radio frequency receiver and transmitter 614 and an associated antenna 615. Alternating current energy received from the magnetic induction coupling with a transmission line is modulated in intensity as well as being rectified by an electronically varied controller 608; this control may include either shunt or series control of magnetic circuit output level as is appropriate in view of the saturation and other characteristics of the core of the pickup assembly 200.

Opening and closing of the pickup core movable arm 204 is achieved in the FIG. 6 system by an actuator 612 controlled from the bus 626 in a manner observable by one of the silent unmanned aerial vehicle cameras, the docking camera 618. Energy transmission line proximity sensing as may be used as an aid to silent unmanned aerial vehicle docking on a transmission line conductor is provided by the bus extension at 613 by which power line proximity data received from the assembly 200 in an open jaw condition is communicated. The downward directed data camera 620 is used to provide the surveillance data sought by the silent unmanned aerial vehicle; this data may be communicated in real time by way of the bus 626, the computer 616 and the receiver/transmitter 614 or alternately may be stored in the computer 616 or an auxiliary memory for dumping upon inquiry or at a later convenient time. Orientation of the camera for scanning or field of view enhancement may be used if needed. Orientation of the pickup core movable arm 204 into positions other than a fixed axial or fixed lateral position may be accomplished with another controller apparatus operating from the busses 626 and 628.

Figure 8A:
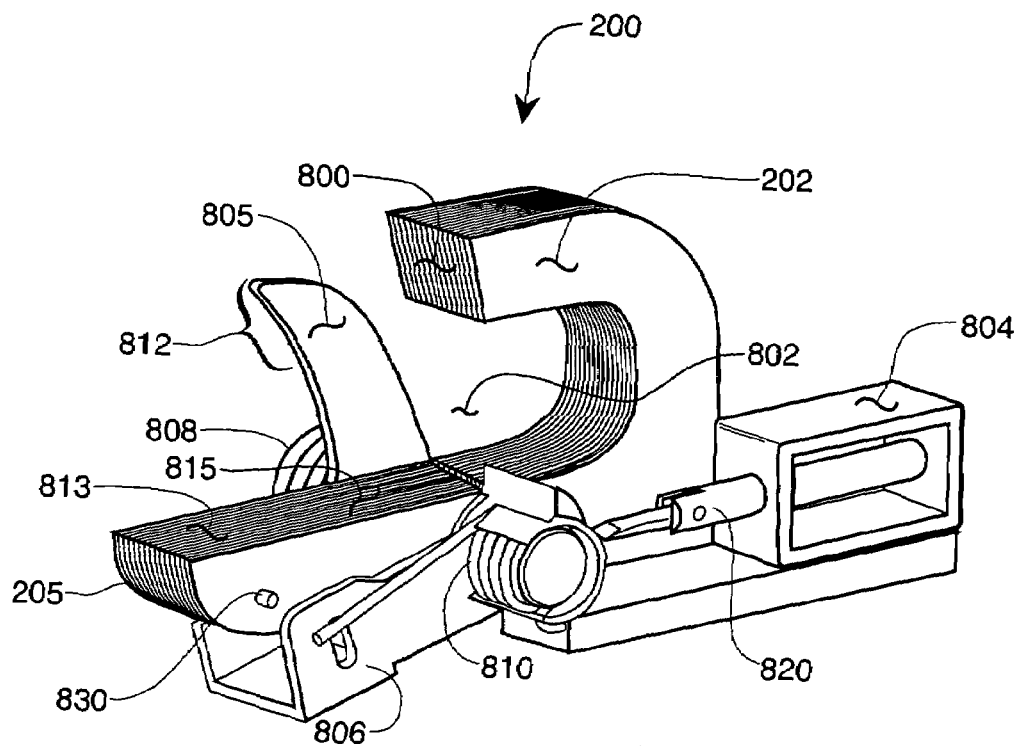
FIG. 8 includes the views of FIG. 8a, FIG. 8b and shows details of an energy collection apparatus.
Figure 8B:
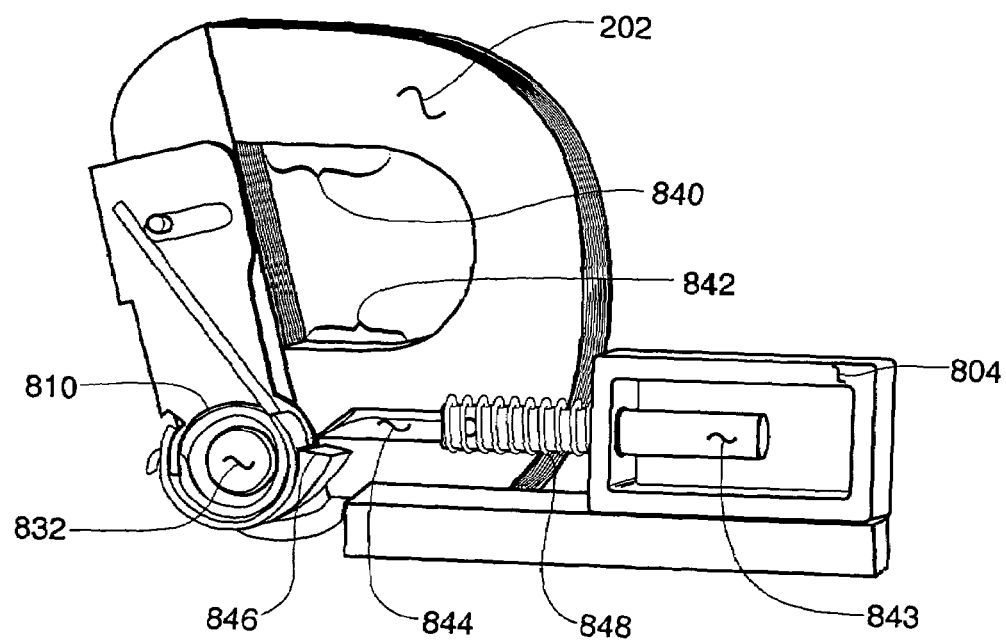

FIG. 8 in the drawings shows an alternate and perhaps more real world considered arrangement of the energy collection apparatus 200 usable with the surveillance aircraft of the present invention. In the FIG. 8*a* drawing of this group the energy collection apparatus 200 is shown to include a magnetic core portion 202 having the two flat faced surfaces 800 and 802, a core portion that is closed magnetically by the mating flat faced surfaces 813 and 815 of the movable jaw portion 205. Both the energy collection apparatus 200 and the movable jaw portion 205 are made of magnetic laminations in the FIG. 8 drawings and the uppermost of these laminations are provided with longer length to orient the movable arm 205 in an off vertical closed position, as appears in the FIG. 8*b* drawing. The longer upper arm 840 with respect to lower arm 842 of the core 205 aids in aircraft landing or docking and retention on a transmission line conductor. FIG. 8*a* also shows a first torsion spring 810, a solenoid 804, a latch member 806 and a second coil spring 808 used during movements of the FIG. 8*a* power transmission line conductor trigger 805 and latch 806. A rotational pin for the movable jaw portion 205, the latch 806 and the springs 808 and 810 appears at 832 in the FIG. 8*b* drawing.

The portion of the trigger 805 and latch 806 engaged by the transversely moving incoming energy conductor from which the battery of the aircraft is charged is designated at 812 in the FIG. 8 drawing. During this movement the landing aircraft may for example be moving initially at a velocity of 35 miles per hour or 616 inches per second and may decelerate to zero velocity over a distance of about 0.75 inch while moving the trigger 805 and latch 806 and winding the spring 808; this sequence may for example occur in a time near 1.22 milliseconds and achieves closing of the latch 806 and core 202. During such deceleration the aircraft may rotate around the transmission line conductor however such rotation is acceptable to both aircraft and transmission line under normal conditions. In the wound condition spring 808 tends to open the latch 806 and to urge the movable jaw 205 toward an open position; the spring 810 tends to urge the movable jaw toward the closed position—by way of the pin 830.

The latch 806 and movable jaw 205 are retained in the closed condition by way of the radial notch 846 in the latch pivot area; this notch is engaged by the stop element 844 connecting to the solenoid pin 820 as a cam surface of the latch 806 forces the solenoid pin to move rightward in FIG. 8*b* against the coil spring 848 during movable jaw 205 closure. The pin 820 of solenoid 804 is shown to include such a spring 848 and to appear in an extended condition, represented at 843 in the FIG. 8*b* drawing. Windings used to control operation of the FIG. 8 solenoid 804 for latch opening are omitted for the sake of clarity in the FIG. 8 drawings. Similarly windings used for energy collection during the recharging process are also omitted for the sake of clarity on the core portion 202 in FIG. 8*a* and FIG. 8*b*. Opening of latch 806 occurs on command of a signal from within the aircraft and involves momentary closure of solenoid 804 at 843 to release the latch 806, open the movable jaw 205, unwind the spring 808 and "expel" the energized transmission line conductor from within the core 202. As a result of this expulsion the aircraft 100 is moved backward and forced clear of the transmission line conductor and is ready for powered flight again.

Figure 7:
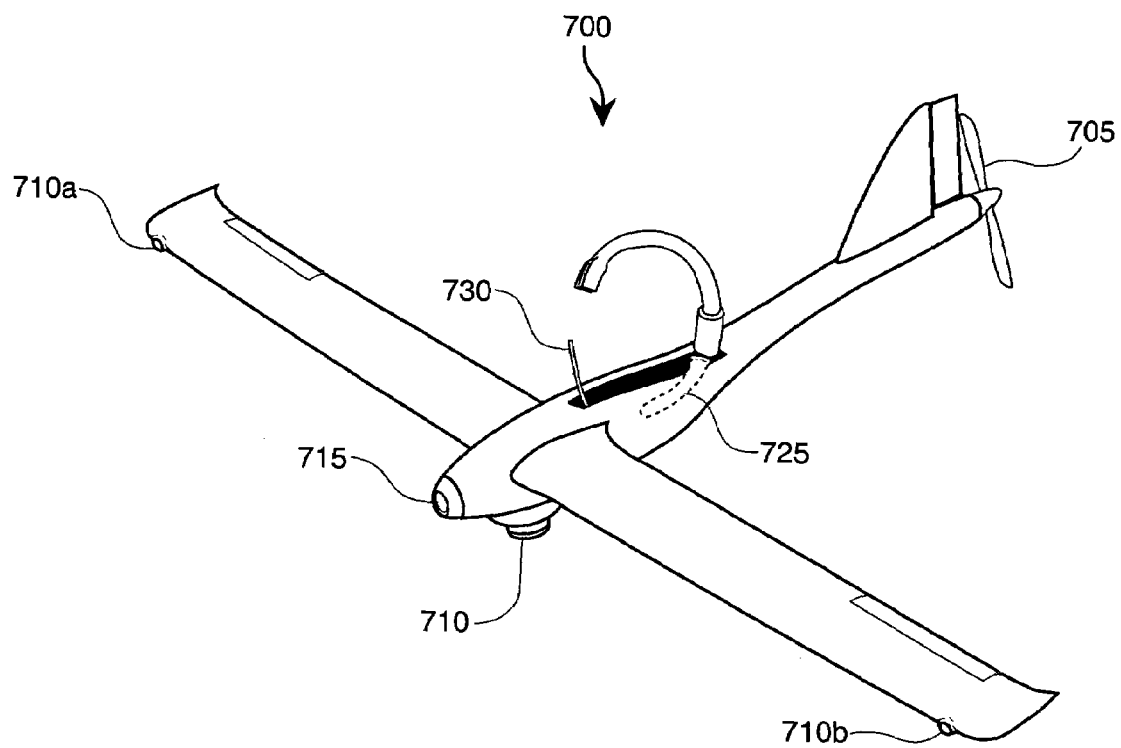
FIG. 7 shows details of an alternate surveillance aircraft arrangement usable with the invention.

FIG. 7 in the drawings shows an alternate airframe arrangement of a power line sentry according to the present invention. In the FIG. 7 drawing a single pusher propeller-driven aircraft 700 is used to contain the FIG. 6 or other components in an overall arrangement that is believed to be lighter in weight and lower in cost than with the aircraft heretofore shown since there is now only a single motor versus three in FIG. 2. It is helpful however to appreciate that, the advantage of the aircraft previously shown in FIG. 2 is agility since such a ducted-fan aircraft has much more maneuverability then a single engine aircraft as shown in FIG. 7. This in turn makes it easier to land or park on a transmission line conductor.

Additionally included in the FIG. 7 power line sentry 700 are a second visible spectrum camera 715, shown to be mounted in a forward-looking position in the aircraft 700, and a pair of Hall effect or other Gauss sensors 710*a* and 710*b* that are disposed in forward looking aircraft positions where they can be used to sense the magnetic fields emanating at 60 Hz or 50 Hz from the transmission line during an approach of the aircraft 700 to a transmission line conductor or other energized magnetic field emitting target element. Notably the Gauss sensors 710*a* and 710*b* are disposed on widely separated parts of the aircraft 700 in order to provide the greatest possible distinction between the two received signals. Notably in addition, since the spit-core current transformer 200 is open at this time it is basically configured as a solenoid. As such it can have a dual-use in that it too can be uses as a third magnetic sensor. These three magnetic sensors moreover may be configured with their sensing axis to be in line with each of the three X, Y, and Z spatial coordinate axis. The outputs from these sensors are fed to the computer 616 through the bus 626 to be used to guide the aircraft 700 in for a landing on the transmission line conductor. The FIG. 7 aircraft 700 is also provided with a mechanical trigger mechanism, similar to that disclosed in FIG. 8, and shown at 730 in FIG. 7, in which kinetic energy developed at the time of aircraft 700 docking on a transmission line conductor may be converted into potential energy for storage and use during disengagement of the aircraft 700 from its docked condition and returning to a flight supported condition. This stored energy can supply a helpful initial sendoff push for the aircraft 700. The previously described infrared camera is represented in the downward looking position at 210 in the FIG. 7 drawing.

Figure 9:
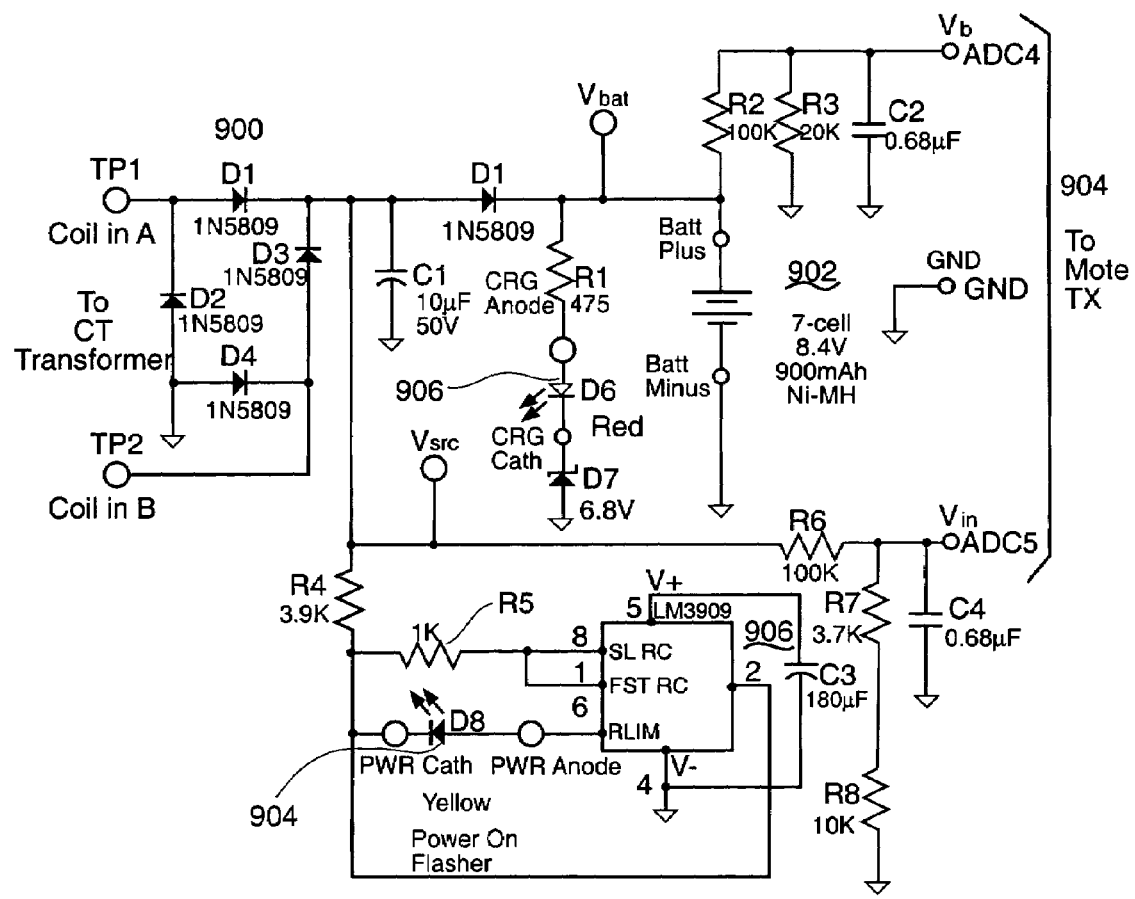
FIG. 9 shows a representative trickle charger circuit usable with rechargeable batteries of the type useful with the present invention.

FIG. 9 in the drawings shows a representative trickle charger circuit usable with rechargeable batteries of the type employable with the present invention. In the FIG. 9 circuit a full-wave bridge rectifier circuit 900 is connected to a transmission line conductor pickup coil of the type shown at 200 in FIG. 2 and 200 in FIG. 8 and the output of this circuit applied to a rechargeable battery 902 of the type also used in obtaining the FIG. 5 data. Battery and charger condition indicating light emitting diodes are shown at 904 and 906 in the FIG. 9 drawing and these are connected to have unusual responsivity to the indicated battery voltage and charger output voltage. A switching circuit is used at U9 in the circuit 906 to ensure sensitivity and accuracy of this light emitting diode 904 indication. Remote data indicating lines appear at 904 in FIG. 9 and provide high impedance filtered signals suitable for remotely indicating battery and charger voltages to an operator via the bus 626 in FIG. 6 for example.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. A sub-human sized aircraft comprising: an electrical apparatus for collecting aircraft propulsion electrical energy from an opportune energize alternating current transmission line conductor, said electrical apparatus comprising:

a magnetic core member having a movable link portion disposable in a magnetically open core position and a magnetically closed core position, said magnetic core member being mounted on a salient portion of said aircraft in a position of convenient opened core position engagement with said transmission line conductor during an aircraft approach and parking sequence;

a movable core link operating apparatus connected with said magnetic core movable link portion and responsive to an open core and a closed core electrical control signal;

a sensor apparatus received on said aircraft for determining proximity of said aircraft to said energized alternating current transmission line conductor; and a control apparatus responsive to said sensor apparatus and enabling movement of said core link operating apparatus attending transmission line docking and undocking maneuvers.

2. The sub-human sized aircraft of claim 1 wherein said collected electrical energy is magnitude responsive to an electrical current flow magnitude in said opportune energized alternating current transmission line conductor.

3. The sub-human sized aircraft of claim 1 wherein said magnetic core member and said movable link portion each include flat faced abutment portions.

4. The sub-human sized aircraft of claim 1 wherein said magnetic core member and said movable link portion each include interleaved lamination movable magnetic circuit portions.

5. The sub-human sized aircraft of claim 1 wherein said opportune energized alternating current transmission line conductor is located in hostile territory.

6. The sub-human sized aircraft of claim 1 wherein said control apparatus is responsive to one of a signal originating within said aircraft and a ground based control signal.

7. The sub-human sized aircraft of claim 1 wherein said movable core link operating apparatus includes an electrical solenoid element.

8. The sub-human sized aircraft of claim 1 wherein said movable core link operating apparatus includes a docking and undocking energy exchanging spring loaded latch apparatus.

9. The sub-human sized aircraft of claim 1 wherein said sensor apparatus received on said aircraft for determining proximity of said aircraft to said energized alternating current transmission line conductor includes one of a camera member and a Gauss sensor member.

10. The sub-human sized aircraft of claim 1 wherein said sensor apparatus received on said aircraft for determining proximity of said aircraft to said energized alternating current transmission line conductor includes a kinetic energy to potential energy converting resilient member.

11. The sub-human sized aircraft of claim 1 wherein said electrical apparatus further includes a rechargeable electrical battery energized by said aircraft propulsion electrical energy.

* * * * *